United States Patent Office 3,287,209
Patented Nov. 22, 1966

3,287,209
CONTROL OF NEMATODES
Richard W. Simmons, Aaron E. Markham, and Ellis G. King, Bellingham, Wash., assignors to Georgia-Pacific Corporation, Portland, Oreg., a corporation of Georgia
No Drawing. Filed Dec. 16, 1963, Ser. No. 330,548
38 Claims. (Cl. 167—22)

This invention relates to a method for controlling nematodes in a plant growing medium and a composition thereof.

While the presence of nematodes in the soil has been known for some time, it has been only in the last few years that the significance of the damage caused by plant parasitic nematodes has been fully appreciated. Even today, pathological symptoms in plants are regularly ascribed to mineral deficiencies in spite of the fact that nematodes are often the primary cause of this type of disorder.

The control of nematodes in soil and plant growing media is difficult. Achieving complete penetration of soil by a toxicant, adequate distribution of a toxicant and persistence of a toxicant are problems constantly encountered in field applications. Further, the action of many toxicants upon the nematodes is not fully understood. Some toxicants are believed to operate by the blocking of enzyme action within the nematode, while others are effective through different biological actions. As a result, one cannot predict the effectiveness of any particular compound, even though the biological properties of the compound may otherwise be well known.

It is an object of this invention to provide a method of controlling nematodes and freeing soil of the objectionable nematode life. A further object is to provide a plant growing medium substantially free of nematodes.

The above and other objects are obtained according to this invention by treating the plant growing medium with a sufficient amount of a halogenated lignosulfonate to kill a substantial portion of the nematodes. The halogenated lignosulfonate is water-soluble and may be easily applied to the plant growing medium by spraying or irrigation. It is not toxic to higher animal life or to plants. Likewise, it is relatively non-toxic to bacteria normally found in a plant growing medium in the concentrations used so that its use will not upset the bacterial actions found in such media.

The nematocide is usually obtained by the halogenation of a lignosulfonate. The lignosulfonate used in the preparation of the nematocide is obtained by sulfonation of lignin obtained from any source by the various known methods. Lignin is a polymeric substance of substituted aromatics found in plant and vegetable tissue associated with cellulose and other plant constituents. Thus, vegetable and plant tissues are the lignin-containing materials which are the principal sources of lignin.

One of the main sources of lignosulfonate is the residual pulping liquors from the paper and pulp industry where lignocellulosic materials such as wood, straw, corn stalks, bagasse, and the like are processed to separate the cellulose or pulp from the lignin. In the sulfite pulping process, the lignocellulosic material is digested with a bisulfite or sulfite to obtain a sulfonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulose materials from the sulfite or other processes may be treated by various known methods to sulfonate the lignins to the different degrees desired. For example, the residual liquor obtained in an alkaline process of digestion of lignocellulosic material may be sulfonated by reacting the product with a bisulfite or sulfite to obtain a sulfonated residual pulping liquor. Likewise, lignins known as "alkali lignin" obtained from the pulping of lignocellulosic materials with alkali, "hydrolysis lignin" obtained from the hydrolysis of lignocellulosic materials in manufacturing wood sugars, or "hydrotropic lignin" derived from the hydrotropic pulping process may be sulfonated and used.

The sulfonated lignins obtained upon sulfonation of lignin may be salts of certain cations, such as magnesium, calcium, ammonium, sodium, and others. The lignosulfonates thus obtained may be used as such, or may be converted to lignosulfonic acid by addition of an acid or by use of ion exchange resins and used, or converted to salts or complexes of metals or other cations other than that obtained in the sulfonation process. Certain metals may enhance the effectiveness of the nematocide so that under certain conditions the lignosulfonate compounds of these metals or mixtures with these metals may be employed at an advantage. In addition, the lignosulfonate product obtained from the sulfite pulping process or by the sulfonation of other residual pulping liquors or lignin-containing materials may contain many other constituents besides sulfonated lignin. While these other materials may be removed, it is not necessary to do so and the products may be halogenated and used without purification or recovery of the lignosulfonates. Usually, in sulfonated residual pulping liquors, at least 40 to 50% of the dissolved solids are lignosulfonates. At times, however, it may be desirable to recover or remove some of the other constituents found in these products prior to the preparation of the nematocide. For example, spent sulfite liquor contains carbohydrates and other organic compounds in addition to the lignosulfonates. Carbohydrates may be removed by various means such as, for example, oxidation, dialysis, or fermentation. By fermentation, the fermentable sugars may be converted to alcohol or other compounds which are recovered. When the liquors are so treated, for instance, by fermentation, the ratio of lignosulfonates to the other constituents is increased and up to about 90% of the total solids remaining may be lignosulfonates.

Generally, the sulfonated lignin product obtained from residual pulping liquors from a sulfite pulping process, for example, will be a solution containing from 8 to 20 weight percent of solids which include the lignosulfonates and other constituents which have been dissolved in the processing. Since these products obtained from the pulping operation are relatively dilute, it is preferred to concentrate the lignosulfonate-containing solutions prior to halogenation. They may even be dried and the solid material halogenated. Likewise, the liquors may be subjected to additional treatments such as alkaline or acid treatment, partial oxidation by use of oxidizing agents or enzymatic oxidation, and any combination thereof. Furthermore, the lignin-containing materials such as plant and vegetable tissue and unsulfonated pulping liquors may be halogenated and then sulfonated to obtain an effective nematocide. Also, the total product obtained by the halogenation and sulfonation of the lignin-containing materials may be used without the separation or removal of any of the constituents.

The halogenation of the lignin-containing material or sulfonated lignin may be carried out by merely contacting the material with a halogen or a halogenating agent. The reaction of the halogen with lignin is rapid so that the halogenation may be carried out at room temperature or a lower temperature as well as at an elevated temperature. Lignosulfonates are usually halogenated by contacting lignosulfonate solutions. However, if the lignosulfonate-containing materials are processed to obtain the constituents as dry solids, these solids may be halogenated in a dry form, as in a fluid bed column. Also, it may be desirable to effect the halogenation of the lignosulfonate in a dry state by dispersing the solids in a relatively inert liquid medium such as a petroleum hydrocarbon or a halogenated solvent as carbon tetrachloride and contacting the suspension with the halogenating agent in gaseous or other form. When halogenating the lignosulfonate product in a "dry" state, it is generally desirable that the product contain at least a small amount of moisture such as one weight percent or so. The lignosulfonates are generally hygroscopic to a certain extent and when exposed to the atmosphere may contain from 2 to about 8 weight percent and often up to 10 weight percent of moisture.

The various known halogenating agents which introduce the halogen into the lignin molecule may be used to effect the halogenation. Illustrative examples of such halogenating agents are the elementary halogens as chlorine and bromine; halogen halides; hypohalous acids as hypochlorous acid, hypobromous acid, and their salts and esters; haloamines as chloramine, and bromamine, mixtures of a halogen acid and halates as hydrochloric acid and sodium chlorate; and the halogen oxides as chlorine dioxide. The gaseous halogenating agents such as chlorine or bromine are usually most convenient to use and thus preferred.

Only a small proportion of halogen is required to make the lignosulfonate effective or toxic to nematodes. With chlorine, as little as 0.1% by weight of organically combined chlorine provides a product toxic to nematodes. The toxicity unexpectedly increases markedly with small increases in the organic chlorine content, maximum killing effectiveness being reached generally in the range of 0.5 to 4 weight percent. While a chlorinated product containing up to 13% or higher of organic chlorine may be used, a product containing over about 4% is seldom necessary. Generally, the effectiveness of toxicity of the nematocide unexpectedly decreases relatively rapidly with an increase in the chlorine content beyond a certain point. The critical point at which this takes place may vary somewhat due to the particular processing or source of the sulfonated lignin-containing material, but generally it occurs at a low concentration of about 0.7 to 3 weight percent organic chlorine so that the most effective products are those containing not more than 4 percent chlorine.

When bromine is used, higher concentrations of the halogen are desirable. This greater addition, along with the increase in atomic weight, results generally in a product which contains from 2 to about 20 weight percent of bromine, preferably in the range of 5 to 15 weight percent.

The term "organic halogen" or "organically combined halogen," as used herein, means halogen in combination with the organic components of the product as distinguished from that present as an inorganic halide. Such organic halogen is often measured by determining separately the total halogen content and the inorganic halide content of the product and taking the difference between the two analyses as organic halogen. Inorganic halide is usually determined by precipitation from an aqueous solution of the halogenated product with silver nitrate. The organic halogen is expressed on the basis of sulfonated lignin calculated as lignosulfonic acid, unless specified otherwise.

While the halogenation of the lignosulfonate may be carried out in various ways, it is often convenient to carry out the halogenation of a lignosulfonate-containing residual pulping liquor in a solution without the separation of the lignosulfonate from the other constituents. The lignosulfonate-containing liquor is preferably concentrated until the solution contains from 20% to 50% of the dissolved materials and the concentrated solution is contacted with the halogenating agent. A halogen, such as chlorine or bromine, is preferably used. In the halogenation reaction, a certain amount of the halogenating agent may be lost or ineffectively utilized by reacting with other constituents or forming products such as hydrochloric acid which do not contribute to the effectiveness of the product. However, generally the proportion of organic halogen in the product increases with an increase in the amount of halogen or halogenating agent added. Thus, the amount of halogenation obtained may be determined and controlled by controlling the amount of the halogenating agent added. When this method is used in halogenation with chlorine, for example, the proportion of chlorine added to a lignosulfonate-containing product normally obtained from residual pulping liquors to obtain a satisfactory nematocide is about 0.2 weight percent or more of the total solids content of the starting material. While the addition of about 0.2 percent of chlorine to the solution will generally result in obtaining about 0.1 percent of organically combined chlorine, the addition of about 40 weight percent will result in a product containing about 12 to 13 percent of organic chlorine. To obtain a product which contains from 0.5 to 4 percent organically combined chlorine, it normally requires an addition of about 1 to 12 weight percent of chlorine.

An illustrative example of the portion of chlorine absorbed in a solution compared to the organically combined chlorine obtained is shown in Example V. As in this example, the organic chlorine content of the product may be based upon the determination of sulfonated lignin by ultraviolet light absorption. For products such as residual pulping liquors, lignosulfonate determinations are commonly based on the absorption of ultraviolet light at a wave length of 2325 A. or 2800 A. from which the lignosulfonate content is calculated. Other methods may also be used. For example, in particular situations, it may be preferred to determine the lignosulfonate by the precipitation of the lignosulfonate from the product as an insoluble amine salt formed with a high molecular weight amine. Such amine salts of sulfonated lignin are substantially insoluble in an aqueous medium and thus the sulfonated lignin may be precipitated. This method may likewise be used for the determination of halogenated sulfonated lignin, even though the solubility of the amine salt may be somewhat affected by the halogenation.

Also, in the determination of organic chlorine, the organic chlorine obtained by the analysis may often be considered to be combined only with the sulfonated lignin. While in the sulfonation of a lignin-containing material a product is usually obtained which contains other constituents besides the sulfonated lignin these products generally do not contain any appreciable amount of organic constituents which would be present in the final product in halogenated form other than the lignosulfonates. Also, the halogenation of these products, to the extent generally employed, does not materially affect the sulfonated lignin content in the product. However, for products containing organic constituents, other than sulfonated lignin, which would be halogenated and be present in the final product, or where the halogenation is carried out under conditions appreciably altering the lignosulfonate content, it is apparent that such factors would have to be taken into consideration.

In application of the nematocide, five parts or even less of the nematocide per million parts of soil or plant growing medium effects a substantial kill. Depending upon the severity of the infestation, from 15 to 80 parts of the nematocide per million parts of the plant growing medium imparts a sufficient concentration of the halogenated lignosulfonate to obtain effective nematode control. The halogenated product is not significantly phytotoxic so that it may be added to the soil in much greater quantities without injury to plants. However, seldom more than 400 parts per million are added. Generally, to obtain the desired control with the nematocide prepared from sulfonated residual pulping liquor, about 10 or more pounds per acre of the nematocide, based upon the total halogenated solids content of the liquor, are used, with from 40 to 200 pounds being preferred. Seldom more than 1000 pounds of the halogenated sulfonated lignin material solids per acre, corresponding to about 500 parts per million, are employed, although greater amounts may be used if desired.

The concentration of the nematocide in the product used in the application to the soil or plant growing medium is immaterial as long as the desired concentration of the nematocide is obtained in the soil or plant growing medium. For example, washings obtained in the chlorine bleaching of sulfite pulp containing small amounts, e.g., .05% of chlorinated lignosulfonate, are effective upon the addition of a sufficient amount of the washings.

Likewise, the effectiveness of the halogenated lignosulfonate is enhanced in the presence of certain metals permitting a reduction in the minimum amount of the halogenated sulfonated lignin necessary to control the nematodes for example, as little as one part per million of plant growing medium may be sufficient. Metals which form sulfides that are substantially insoluble in a weakly acidic solution, e.g., at a pH of about 1, commonly referred to as Group I and Group II metals in qualitative analysis, and mixtures thereof, unexpectedly enhance the effectiveness of the nematocide. These metals such as, for example, mercury, lead, copper, bismuth, silver, antimony, and arsenic may be interacted with the sulfonated lignin to form the metal salt or complex of the lignosulfonate or may be added as a compound which will supply the metal ions. For example, a copper salt or complex of lignosulfonate may be prepared and used. However, metals such as mercury or silver, for example, which may be difficult to react or complex with the lignosulfonate may be added or intermixed with the halogenated, sulfonated lignin as an organic or inorganic compound. Such compounds should be sufficiently soluble to provide the metal ions in the concentration required to enhance the action of the halogenated, sulfonated lignin.

To obtain the increase in effectiveness, only a small amount of the metal is employed; for example, 0.1 part of metal per million parts of the growing medium may be used. The metals which may normally have toxic effects upon plants or animals may be present in such small concentrations that the metal is non-toxic at the concentrations employed. While the amount of the toxic metals added may be considerably higher, it is usually advantageous to have the metal concentration below the amount at which it is toxic to plant or other animal life. Generally, the amount of the metal employed is in the range of about 1 to 10 parts by weight of the metallic element per million parts of the plant growing medium. Even though the concentration of the metal may be further increased, usually the concentration of the metallic ion is maintained below 100 parts of the metal per million parts of the plant growing medium.

When the halogenated, sulfonated lignin is intermixed with the metal compound to form a mixture useful for many applications, usually a sufficient amount of the metal compound is added to obtain a mixture which contains from 1 to 20 weight percent of the metal based upon the solids content of the halogenated, sulfonated lignin.

The unit of "parts per million" as used herein is based upon one acre containing 2,000,000 pounds of soil which includes the soil to plow depth.

Since the halogenated lignosulfonates and the metal compounds, if added, are water-soluble, they may be applied to the soil or plant growing medium in a number of ways. The nematocide may be dissolved in water and the solution sprayed on the soil or the plant growing medium, or the nematocide may be added to irrigation water. Also, the halogenated lignosulfonate and the metal compounds, if added, may be added in a dry form to a fertilizer or added together or individually to the soil. The nematocide can then be intermixed with the soil by cultivation or allowed to remain as applied until rain or irrigation water dissolves and distributes it throughout the soil or plant growing medium.

The following examples further illustrate the invention. The organic halogen content where expressed in the examples was made by determining the total halogen in the product by the peroxide bomb fusion method from which the inorganic halogen content was subtracted. The inorganic halogen content was determined by the precipitation of the halogen by the addition of silver nitrate to an aqueous solution of the product.

*Example I*

Different halogenated lignosulfonates were tested for their effectiveness in killing nematodes of the Rhabditis family. The nematodes for the test were obtained by screening a heavily infested soil, using those which passed through a 40 mesh sieve and were retained on a 200 mesh sieve. These nematodes were used to inoculate culture flasks containing agar gel, in which pea seeds had germinated. After time for the nematodes to multiply, a portion of the gel was removed and suspended in enough water to give a suspension containing about 30 nematodes per milliliter. The agar gel suspension was used in a series of tests with different lignosulfonates. To make a test, 2 milliliters of the suspension were mixed in a Petri dish with 18 milliliters of water, and the number of nematodes in the dish was counted. A lignosulfonate to be tested was added to the dish and mixed in, and after 90 minutes, the number of live nematodes remaining was counted. The results of tests of 8 different halogenated lignosulfonates were compared with that of a fermented spent sulfite liquor (not halogenated) and a blank in which water only was added to the Petri dish containing the nematodes in agar.

The results are shown in the table below. The amount of the nematocide shown in the table is the weight of the total solids content of the halogenated products.

| Test No. | Nature of Halogenated Lignosulfonate | Amount Added, Micrograms | Conc. in Sol., p.p.m. | No. of Live Nematodes | | Percent Kill |
|---|---|---|---|---|---|---|
| | | | | Initially | After 90 Min. | |
| 1 | Purified Lignosulfonate, Brominated | 100 | 5 | 37 | 18 | 51 |
| 2 | Chlorolignosulfonate (chlorinated in carbon tetrachloride medium) | 100 | 5 | 57 | 34 | 40 |
| 3 | Chlorolignosulfonate (dry chlorination) | 100 | 5 | 41 | 10 | 76 |
| 4 | Chlorolignosulfonate (high molecular weight) | 100 | 5 | 110 | 61 | 45 |
| 5 | Chlorolignosulfonate (hypochlorite) | 100 | 5 | 51 | 28 | 45 |
| 6 | Chlorolignosulfonate (chlorine dioxide) | 100 | 5 | 55 | 27 | 51 |
| 7 | Chlorolignosulfonate (from Kraft liquor) | 100 | 5 | 138 | 69 | 50 |
| 8 | Chlorolignosulfonate (neutral hardwood) | 100 | 5 | 124 | 46 | 63 |
| Blank 1 | Fermented Spent Sulfite Liquor | 1,000 | 50 | 40 | 38 | 5 |
| Blank 2 | Water Only | 0 | 0 | 30 | 30 | 0 |

In Test 1 above, the brominated lignosulfonate used was obtained by brominating a purified calcium lignosulfonate of the following analysis: 11.2% methoxyl, 6.0% sulfonate sulfur, 3.9% reducing sugars, and 3.8% calcium, and a diffusion coefficient of 10.9 mm.$^2$ per day as determined by the procedure described by Felicetta, V. F., et al., J. Am. Chem. Soc. 71, 2879 (1949). About 10 g. of this calcium lignosulfonate was suspended in 30 milliliters of methanol and about 3 ml. of liquid bromine was slowly added. The product was stirred for 3½ hrs. at a temperature of 10° to 25° C. during which time the solids dissolved in the methanol. The solution was neutralized with triamyline, and the brominated product was precipitated by pouring the solution into water. The dried solid product contained 16.8 weight percent of organically combined bromine.

In Test 2, the chlorolignosulfonate used was prepared by chlorinating fermented spent sulfite liquor solids. These solids were obtained from the spray-drying of evaporated calcium base spent sulfite liquor (derived from the pulping of softwoods by the calcium bisulfite process), which liquor had been fermented by the yeast, Saccharomyces cerevisiae, to convert most of the fermentable sugars to alcohol which was then recovered. Two hundred grams of this powdered lignosulfonate-containing product were dispersed in one liter of carbon tetrachloride. Chlorine gas was bubbled into the mixture for one hour at a temperature of about 15° C. to 20° C. After the chlorination, the mixture was warmed to 65° C. to remove hydrogen chloride and chlorine gas which may have been absorbed. The suspended product was recovered by filtration, washed with carbon tetrachloride, and dried. The product contained 4.7 weight percent of organically combined chlorine, based upon the total solids after chlorination and drying.

The chlorolignosulfonate used in Test 3 was likewise obtained from a calcium base fermented spent sulfite liquor similar to that described above. The fermented spent sulfite liquor, however, was spray dried to obtain a solid which contained 7.3 percent moisture. This powdered material was suspended in a fluidized bed and chlorinated with gaseous chlorine at a temperature of around 25° C. During chlorination, the temperature increased to about 80° C. At the end of the chlorination, the product was heated to 232° C. over a 40 minute period by use of hot air. The product contained 3.2 percent organically combined chlorine, based upon the total solids after chlorination and drying.

In Test 4, a fermented calcium base spent sulfite liquor similar to that described above was fractionated by alcohol precipitation to obtain the high molecular weight lignosulfonates relatively free of other constituents normally found in a residual pulping liquor. In the fractionation, about 61 percent of the total solids was retained in the product, which was dissolved in water to obtain a solution containing 20 weight percent of lignosulfonate. The solution was halogenated by passing chlorine gas into the solution until 3.9 weight percent of chlorine, based on the weight of the lignosulfonate, had been absorbed.

In Test 5, a 48% solution of a fermented calcium base spent sulfite liquor such as that described above was adjusted to a pH of 8.7 by the addition of sodium hydroxide. The neutralized solution was diluted to 20% solids concentration and chlorinated by the addition of a calcium hypochlorite solution at 31° C. in an amount equivalent to 8% of available chlorine, based on the liquor solids. After two hours, the pH was adjusted to 7 with hydrochloric acid.

In Test 6, a portion of the concentrated liquor used for Test 5 above was acidified to pH 2 with sulfuric acid, diluted to 20% solids and chlorinated by use of chlorine dioxide. The chlorine dioxide was added as an aqueous solution in an amount equivalent to 5% available chlorine, based upon the pulping liquor solids. After the completion of the reaction, sodium hydroxide was added to raise the pH to 4.5.

In Test 7, a lignosulfonate was used which was a residual pulping liquor obtained in pulping of wood by the Kraft process, later sulfonated and then dried. This product was similar to the product marketed under the trademark "Polyfon T" by West Virginia Pulp & Paper Co. It contained about 4.7% sulfonate sulfur. An aqueous solution of the sulfonated residual pulping liquor was treated with gaseous chlorine until 3.5% of chlorine by weight, based on the total solids, was absorbed.

In Test 8, a residual pulping liquor from a "neutral sulfite" semichemical pulping was used. The liquor was obtained by digesting chips of alder wood, for a total of 4 hours at a maximum temperature of 170° C. in a solution containing 17% of sodium sulfite and 4% of sodium carbonate, based on the weight of the dry wood. The residual liquor had a pH of 8 and contained about 7.3% of solids. After concentration by evaporation, the liquor was adjusted in pH to 7 by the use of sulfuric acid and chlorinated by addition of chlorine water in an amount equivalent to 4% of chlorine, based on residual liquor solids.

In addition to the tests made on suspensions of nematodes as described in Example I, the halogenated products of Tests 1, 2, and 3 were also tested by addition to sand which had been impregnated with the cultured nematodes. The suspension of agar gel containing approximately 30 nematodes per milliliter was used to impregnate the sand. A mixture was prepared by intermixing the agar gel suspension with dry coarse sand in a ratio of 1 milliliter of gel per 20 grams of sand. This mixture was added to a number of vials. To each of the vials, about 100 micrograms of one of the above-mentioned halogenated lignosulfonates in 4 milliliters of water were added. This gave a concentration of about 5 parts of the halogenated lignosulfonate per million parts of sand. After standing overnight, the nematodes in each of the vials were recovered by washing from the sand. No live nematodes were found in any of the vials to which a halogenated lignosulfonate had been added. In a control sample which was prepared in a similar manner to that above except that the halogenated lignosulfonate was not added, 77% of the nematodes were recovered.

*Example II*

Fifty grams of well mixed soil were added to each vial in a series of vials. The soil was obtained from a raspberry field infested with nematodes. Many families of nematodes were represented in the soil with Rhabditis predominating. A predetermined amount of the nematocide was dissolved in 10 milliliters of water and intermixed with the 50 grams of soil in each of the vials to obtain a series of samples having different ratios of the nematocide in the soil. The nematocide was obtained by chlorination with gaseous chlorine at about 25° C. of a fermented spent sulfite liquor containing 20 weight percent solids of which approximately 80 percent was calcium lignosulfonate and neutralizing the product obtained to pH 4 with sodium hydroxide solution. The product contained 1.1 weight percent of organic chlorine, based upon the sulfonated lignin content of the liquor expressed as lignosulfonic acid.

After the soil and the chlorinated lignosulfonate were intermixed, the vials were allowed to stand for 60 hours. After 60 hours, 10 grams of the wet soil were removed from each vial and placed on wet tissue paper for separation and determination of the live nematodes. The method employed was the Baermann technique as described in Geneesk. Tijdschr. Ned. Ind., vol. 57, pp. 131–137 (1917). The results obtained and the proportions of the nematocide added to the vials on the basis of pounds of the chlorinated spent sulfite liquor solids per acre of soil are shown in addition to results with two blanks which were used.

| Vial No. | Pounds per Acre | Surviving Nematodes |
| --- | --- | --- |
| 1 | 340 | 2 |
| 2 | 170 | 2 |
| 3 | 85 | 0 |
| 4 | 42 | 0 |
| 5 | 21 | 1 |
| Blank | 0 | 17 |
| Blank | 0 | 19 |

*Example III*

The nematocidal power of the nematocide of this invention was shown (in vivo) by comparing the growth rate of tomato plants grown, on the one hand, in soil treated with the nematocide, and on the other hand in soil not treated with the nematocide. Four inch pots were filled with soil to which uniform inoculations of nematode were made. The soil in some of the pots was treated with the nematocide, at a dosage calculated to be equivalent to 20 lbs. per acre. Tomato seedlings were then transplanted into the pots. The nematocide was the chlorinated lignosulfonate used in Test 3 of Example I.

As the experiment continued, sample plants were knocked out of their pots, the roots washed free from adherent dirt, the whole plant blotted until free of surface moisture, and weighed. The comparison of weights of the plants in the untreated and treated soil is shown in the table below.

| Days After Planting | Weight per plant, grams | |
| --- | --- | --- |
| | Untreated Soil | Treated Soil |
| 21 | 1 | 2.9 |
| 51 | 6.8 | 18.4 |
| 67 | 15.5 | 31.5 |
| 77 | 23.6 | 47.2 |

*Example IV*

A series of tests was made of halogenated lignosulfonates to illustrate their enhanced effectiveness as nematocides in the presence of particular metals. The first portion of this example involves the use of copper salts.

The source of the lignosulfonate was a concentrated, fermented, calcium base spent sulfite liquir of which about 80 percent by weight of solids were lignosulfonates. In one of the runs, the lignosulfonate was first chlorinated, and this chlorinated product and copper sulfate were mixed and tested for nematocidal activity; while in another run, the copper complex or salt of lignosulfonate was prepared and then this product was chlorinated and tested.

In the first run, solutions of the chlorinated lignosulfonate and copper sulfate were added separately to the dish containing the nematodes used in the test, as described below. The chlorinated lignosulfonate was prepared by bubbling chlorine gas (3.3% based on total solids) into a concentrated solution of the spent liquor, and adding sodium hydroxide solution to a final pH of 3.8.

The second sample of a copper salt of lignosulfonate was prepared by treating a concentrated fermented spent sulfite liquor similar to that used above with 6% of sodium hydroxide, and heating at about 80° C. for 24 hours, then oxidizing it with a small proportion of dichromate and adding copper sulfate solution to give a copper lignosulfonate salt or complex. The product was centrifuged to remove calcium sulfate and spray dried. Analysis showed the presence of 14.1% copper. A portion of this spray dried copper lignosulfonate was dissolved in water to obtain a solution containing about 20 weight percent of solids and then chlorinated with gaseous chlorine by bubbling the chlorine through the solution in a manner described above, thereby adding 3 weight percent of chlorine, based on the weight of the solid copper lignosulfonate.

The effectiveness of chlorinated copper lignosulfonate prepared by the two methods described above was compared with both the chlorinated calcium lignosulfonate salt from which the copper salt was prepared and the unhalogenated copper lignosulfonate.

The tests were made by a procedure similar to that described in Example I. To each of four dishes containing five milliliters of water and a mixed population of parasitic and Saprophytic nematodes, was added the nematocide under test. One hundred micrograms each of the chlorinated copper salt of lignosulfonate, as described above, the chlorinated calcium lignosulfonate containing no copper, and the unhalogenated copper lignosulfonate were added to their respective dishes. To the other dish was added 100 micrograms of chlorinated calcium lignosulfonate and copper sulfate solution containing 19 micrograms of copper. The nematodes in each dish were counted before the addition of the nematocide. After 90 minutes contact of the nematodes with the particular product, the surviving nematodes were again counted. The results are shown below.

Nematocide:  Percent of nematodes killed in 90 min.
Chlorinated lignosulfonate plus copper sulfate __ 70
Chlorinated copper lignosulfonate _____ 79
Chlorinated calcium lignosulfonate _____ 60
Blank—unhalogenated copper lignosulfonate ___ 6

The test described above was repeated separately for certain salts of the metals mercury, silver, bismuth, and lead. However, each salt was added separately in aqueous solution without prior complexing or interaction with the lignosulfonate. The halogenated lignosulfonate used was prepared from fermented calcium base spent sulfite liquor. A solution of the spent sulfite liquor containing 40 weight percent solids was chlorinated by addition of gaseous chlorine until about 11 weight percent of chlorine was added, based upon the spent sulfite liquor solids. The chlorinated product was treated with an excess of calcium hydroxide to precipitate chlorinated, sulfonated lignin which, after washing with lime water, was treated with sulfuric acid to obtain a purified chlorinated, sulfonated lignin. The purified chlorolignosulfonate had an organic chlorine content of about 2.9 weight percent based upon the weight of the dry, ash-free purified product. Upon addition of 100 micrograms of the chlorinated lignosulfonate, a predetermined amount of an aqueous solution of the particular metal salt was also added to the Petri dish to obtain about five parts per million by weight of the metallic element in solution.

The salt added and the results obtained are shown below.

Salt added in addition to
chlorinated lignosulfonate:  Percent kill
Mercury bichloride _____ 73
Silver nitrate _____ 100
Bismuth nitrate _____ 100
Lead acetate _____ 86
Blank—chlorinated lignosulfonate only _____ 48

*Example V*

In order to show how the amount of halogen in a halogenated lignosulfonate relates to its effectiveness as a nematocide, a series of tests was made of the nematocidal activity of lignosulfonate-containing materials chlorinated to different degrees.

A series of chlorinated lignosulfonates was made by the chlorination of concentrated, fermented calcium base spent sulfate liquor containing about 20% solids of which amount about 78.5% was lignosulfonate (calculated as lignosulfonic acid). Chlorine was bubbled into the lignosulfonate solution at a temperature in the range of 25° C. to 50° C. until a certain desired weight increase (based upon the weight of the spent sulfite liquor solids) had been obtained. When the increase in weight indicated that the calculated amount of chlorine had been added, the pH of the solution was adjusted to 4.5 with sodium hydroxide. The series of chlorinated lignosulfonates so prepared represented the addition of quantities of chlorine ranging from 0.5 to 60 weight percent. A precipitate of chlorinated lignosulfonate resulted on the addition of an amount of chlorine equivalent to 60 percent by weight of the solid lignosulfonate material. This chlorinated lignosulfonate precipitate was filtered off, dissolved in water, neutralized to pH 4.5, and was also tested for nematocidal activity. All of the chlorinated products were analyzed for total chlorine and inorganic chlorine, from which organic chlorine was calculated by difference. The determined organic chlorine is considered to be combined with lignosulfonate in the product.

The lignosulfonate content, expressed as lignosulfonic acid, was determined from ultraviolet absorption data obtained at a wave length of 2325 A. by comparing the data with the absorption obtained with a purified lignosulfonate solution of known concentration. The sulfonated lignin determination was made on the basis of the ultraviolet absorption of the spent sulfite liquor before halogenation, even though the determination, if made by using the absorption data of the halogenated products would not differ appreciably except for products which contain a large amount of chlorine. For example, no appreciable change in absorption data was obtained until about 24% chlorine had been absorbed which data, if used, would give a value of about 3% to 5% lower. With the product containing 40% chlorine, ultraviolet absorption of the halogenated product would give a value of 9% to 10% lower.

The methoxyl content of some of the products was also determined. The analyses showed a decrease in the methoxyl content, based upon the spent sulfite liquor solids prior to halogenation, from about 8.8 weight percent prior to halogenation to 8.2, 6.6 and 3.9 weight percent for the products to which 3.1, 16 and 40 weight percent chlorine, respectively, had been added.

The products prepared above were tested for their effectiveness as nematocides using the procedure described in Example IV. The results obtained are shown in the table below. The percentage of chlorine added as shown in the second column of the table is expressed on the basis of the solids content of the spent sulfite liquor prior to halogenation. The organic chlorine, as shown in column 3 of the table, is expressed as weight percent based upon the lignosulfonate content, as lignosulfonic acid, of the spent sulfite liquor solids prior to halogenation.

| Sample | Percent Chlorine Added to Solution | Weight Percent Organic Chlorine | Percent Kill |
| --- | --- | --- | --- |
| 1 | 0 | 0.0 | 0 |
| 2 | 0.5 | 0.3 | 22 |
| 3 | 1.0 | 0.4 | 35 |
| 4 | 2.0 | 0.8 | 51 |
| 5 | 3.1 | 1.0 | 63 |
| 6 | 4.2 | 1.4 | 65 |
| 7 | 8.0 | 2.7 | 46 |
| 8 | 16.0 | 5.7 | 28 |
| 9 | 24.0 | 8.8 | 25 |
| 10 | 32.0 | 10.4 | 19 |
| 11 | 40.0 | 12.2 | 17 |
| 12 | 60.0 | [1] 21.6 | 9 |
|  |  | [2] 31.5 | 0 |

[1] Solution.
[2] Precipitate.

The above results demonstrate the sharp rise of percent kill as the amount of chlorine is increased in the lower part of the range, and the results show that the organic chlorine content of the product is critical in the sense that a peak in effectiveness is reached in the neighborhood of 1% organic chlorine.

What is claimed is:
1. A process for controlling soil-dwelling, plant parasitic nematodes in a nematode infestible plant growing medium, which comprises mixing into the nematode infestible plant growing medium a sufficient amount of a halogenated, sulfonated lignin to kill a substantial portion of the nematodes, said halogenated, sulfonated lignin-containing a toxic amount of organically combined halogen selected from the group consisting of chlorine and bromine.

2. A process for controlling soil-dwelling, plant parasitic nematodes in a nematode infestible plant growing medium, which comprises treating the nematode infestible plant growing medium with a toxic amount of a halogenated, sulfonated residual pulping liquor sufficient to kill a substantial portion of the nematodes, said halogenated, sulfonated residual liquor containing a toxic amount of organically combined halogen selected from the group consisting of chlorine and bromine.

3. A process according to claim 2 wherein the plant growing medium is soil and the halogenated, sulfonated residual pulping liquor is a chlorinated spent sulfite liquor.

4. A process according to claim 3 wherein the chlorinated spent sulfite liquor contains from 0.5 to 4 weight percent of organically combined chlorine.

5. A process for controlling soil-dwelling, plant parasitic nematodes in a nematode infestible plant growing medium, which comprises intermixing into the nematode infestible plant growing medium at least five parts by weight of a halogenated, sulfonated lignin per million parts of the plant growing medium, said halogenated, sulfonated lignin containing at least 0.1 weight percent of an organically combined halogen selected from the group consisting of chlorine and bromine.

6. A processing according to claim 5 wherein the halogen is chlorine.

7. A process for controlling soil-dwelling, plant parasitic nematodes in a nematode infestible plant growing medium, which comprises intermixing into the nematode infestible plant growing medium from 5 to 400 parts by weight of a chlorinated, sulfonated lignin per million parts of plant growing medium, said chlorinated, sulfonated lignin containing from 0.1 to 13 weight percent of organically combined chlorine.

8. A process according to claim 7 wherein the chlorinated, sulfonated lignin contains from 0.5 to 4 weight percent of organic chlorine and is intermixed with soil in an amount of from 15 to 80 parts by weight per million parts of soil.

9. A process according to claim 8 wherein the chlorinated, sulfonated lignin is a compound of a metal selected from the group consisting of alkaline earth metals, alkali metals, and ammonium.

10. A process according to claim 9 wherein the metal is calcium.

11. A process for controlling soil-dwelling, plant parasitic nematodes in a nematode infestible plant growing medium, which comprises intermixing into the nematode infestible plant growing medium from 5 to 400 parts by weight of a brominated lignosulfonate per million parts of plant growing medium, said brominated lignosulfonate containing from 2.0 to 20 weight percent of organically combined bromine, based upon the sulfonated lignin content expressed as lignosulfonic acid.

12. A process for controlling soil-dwelling, plant parasitic nematodes in a nematode infestible plant growing medium, which comprises intermixing into the nematode infestible plant growing medium from 5 to 500 parts by weight based upon the dry solids of a chlorinated, sulfonated residual pulping liquor, per million parts of a plant growing medium, said chlorinated, sulfonated residual pulping liquor containing from 0.1 to 13 weight percent of organically combined chlorine, based upon the sulfonated lignin content of the liquor expressed as lignosulfonic acid.

13. A process according to claim 12 wherein the plant growing medium is soil and the chlorinated lignosulfonate-containing residual pulping liquor is a spent sulfite liquor containing from 0.5 to 4 weight percent of organically combined chlorine intermixed with soil in an amount of 40 to 200 pounds based upon the dry solids of the chlorinated spent sulfite liquor per acre.

14. A process for controlling soil-dwelling, plant parasitic nematodes in a nematode infestible plant growing medium, which comprises intermixing into the nematode infestible plant growing medium from 5 to 500 parts by weight based upon the dry solids of a chlorinated, sulfonated residual pulping liquor per milion parts of the plant growing medium, said chlorinated, sulfonated residual pulping liquor having been chlorinated in an aqueous medium until from 0.2 to 40 weight percent of chlorine, based upon the sulfonated residual pulping liquor solids, is absorbed.

15. A process according to claim 14 wherein the chlorinated, sulfonated residual pulping liquor has been chlorinated until from 1 to 12 weight percent of chlorine is absorbed and wherein the plant growing medium is soil.

16. A process according to claim 15 wherein the chlorinated, sulfonated residual pulping liquor is a chlorinated spent sulfite liquor.

17. A process according to claim 16 wherein the chlorinated spent sulfite liquor is intermixed into the soil in an amount of from 40 to 200 pounds of the chlorinated, spent sulfite liquor solids per acre.

18. A process for growing plants in a plant growing medium substantially free of plant parasitic nematodes, which comprises treating the plant growing medium with from 5 to 500 parts by weight of a halogenated, sulfonated residual pulping liquor per million parts of the plant growing medium, said halogenated, sulfonated residual pulping liquor containing at least 0.1 weight percent of an organically combined halogen selected from the group consisting of chlorine and bromine and growing the plant in the so-treated substantially free of plant parasitic nematodes plant growing medium.

19. A process for growing plants in a plant growing medium substantially free of plant parasitic nematodes, which comprises treating a soil with from 10 to 1000 pounds, based upon the dry solids, of a chlorinated lignosulfonate containing residual pulping liquor per acre, said chlorinated lignosulfonate containing residual pulping liquor containing from 0.1 to 13 weight percent, based upon the sulfonated lignin content of the liquor expressed as lignosulfonic acid, of organically combined chlorine and growing the plant in the so-treated substantially free of plant parasitic nematodes soil.

20. A process according to claim 19 wherein the chlorinated lignosulfonate-containing residual pulping liquor is a chlorinated spent sulfite liquor containing from 0.5 to 4 weight percent organic chlorine and the chlorinated spent sulfite liquor is intermixed with the soil in an amount of from 40 to 200 pounds per acre.

21. A composition having nematocidal activity consisting essentially of a plant growing medium and at least five parts by weight of a halogenated lignosulfonate as the essential nematocide constituent per million parts of plant growing medium, said halogenated, sulfonated lignin containing from 0.1 to 13 weight percent of organically combined halogen selected from the group consisting of chlorine and bromine.

22. A composition having nematocidal activity consisting essentially of a plant growing soil and from 20 to 100 parts by weight based upon the dry solids of a chlorinated spent sulfite liquor as the essential nematocide constituent per million parts of soil, said chlorinated spent sulfite liquor containing from 0.5 to 4 weight percent of organic chlorine, based upon the sulfonated lignin content of the liquor expressed as lignosulfonic acid.

23. A process for controlling soil-dwelling, plant parasitic nematodes in a plant growing medium, which comprises treating the plant growing medium with a sufficient amount of a halogenated, sulfonated lignin and a metal ion to kill a substantial portion of the nematodes, said metal ion being of a metal which forms a substantially insoluble sulfide in a weakly acid aqueous solution having a pH of about 1 and said halogenated, sulfonated lignin containing a toxic amount of organically combined halogen selected from the group consisting of chlorine and bromine.

24. A process for controlling soil-dwelling, plant parasitic nematodes in a plant growing medium, which comprises treating the plant growing medium with a sufficient amount of a halogenated, sulfonated lignin and a water-soluble metal compound to kill a substantial portion of the nematodes, said metal compound being of a metal which forms a substantially insoluble sulfide in a weakly acid aqueous solution having a pH of about 1 and said halogenated, sulfonated lignin containing a toxic amount of organically combined halogen selected from the group consisting of chlorine and bromine.

25. A process according to claim 24 wherein the metal compound is a copper compound.

26. A process according to claim 24 wherein the metal compound is a mercury compound.

27. A process according to claim 24 wherein the metal compound is a silver compound.

28. A process according to claim 24 wherein the metal compound is a bismuth compound.

29. A process according to claim 24 wherein the metal compound is a lead compound.

30. A process for controlling soil-dwelling, plant parasitic nematodes in a plant growing medium, which comprises treating the plant growing medium with a sufficient amount of a halogenated, sulfonated residual pulping liquor and a water-soluble metal salt to kill a substantial portion of the nematodes, such halogenated, sulfonated residual liquor containing a toxic amount of organically combined halogen selected from the group consisting of chlorine and bromine and said metal salt being of a metal which forms substantially an insoluble sulfide in a weakly acid aqueous solution having a pH of about 1.

31. A process according to claim 30 wherein the plant growing medium is soil and the halogenated, sulfonated residual pulping liquor is a chlorinated spent sulfite liquor.

32. A process for controlling soil-dwelling, plant parasitic nematodes in a plant growing medium, which comprises intermixing into the plant growing medium from 1 to 400 parts by weight of a chlorinated, sulfonated lignin per million parts of plant growing medium and a water-soluble metal salt in an amount to obtain from 0.1 to 100 parts by weight of the metal in the compound per million parts of plant growing medium, said chlorinated, sulfonated lignin containing from 0.1 to 13 weight percent of organically combined chlorine and said metal salt being of a metal which forms a substantially insoluble sulfide in a weakly acid aqueous solution having a pH of about 1.

33. A process for controlling soil-dwelling, plant parasitic nematodes in a plant growing soil, which comprises intermixing into the soil from 10 to 1000 pounds per acre of a chlorinated spent sulfite liquor, based upon the solids of the chlorinated liquor, and a water-soluble metal salt in an amount to obtain from 0.1 to 100 parts by weight of the metal in the salt per million parts of soil, said chlorinated, spent sulfite liquor containing from 0.1 to 13 weight percent of organically combined chlorine, based upon the lignosulfonate content of the unchlorinated liquor expressed as lignosulfonic acid, and said metal of the metal salt forming substantially insoluble sulfide in a weakly acid aqueous solution having a pH of about 1.

34. A process according to claim 33 wherein the chlorinated spent sulfite liquor contains from 0.5 to 4 weight percent of organic chlorine, and is intermixed with soil in an amount of from 40 to 200 pounds per acre and the metal is intermixed in an amount to obtain from 1 to 10 parts of the metal in the salt per million parts of soil.

35. A process according to claim 33 wherein the metal salt is a salt of a metal selected from the group consisting of mercury, lead, copper, bismuth, silver, antimony, and arsenic intermixed in an amount to obtain from 1 to 10 parts of the metal in the salt per million parts of soil.

36. A composition comprising a plant growing medium and at least one part by weight of a halogenated, sulfonated lignin per million parts of plant growing medium, said halongenated, sulfonated lignin containing from 0.1 to 13 weight percent of organically combined halogen, selected from the group consisting of chlorine and bromine, and a water-soluble salt of a metal forming a substantially insoluble sulfide in a weakly acid aqueous solution having a pH of about 1, said metal salt being present in an amount to obtain from 0.1 to 100 parts by weight of the metal in the salt per million parts of plant growing medium.

37. A composition according to claim 36 wherein the halogenated, sulfonated lignin is a chlorinated residual pulping liquor containing from 0.5 to 4 weight percent of organic chlorine, based upon the sulfonated lignin content of the liquor expressed as lignosulfonic acid.

38. A composition comprising a plant growing soil, from 20 to 100 parts by weight, based upon the dry solids, of a chlorinated spent sulfite liquor per million parts of soil, said chlorinated spend sulfite liquor containing from 0.5 to 4 weight percent of organic chlorine, based upon the sulfonated lignin content of the liquor expressed as lignosulfonic acid, and a metal salt of a melt selected from the group consisting of copper, lead mercury, bismuth and silver in an amount to obtain from 1 to 10 parts by weight of the metal in the salt per million parts of soil.

References Cited by the Examiner
UNITED STATES PATENTS

| | | | |
|---|---|---|---|
| 1,585,792 | 5/1926 | Schlumberger | 167—22 |
| 2,263,948 | 11/1941 | Halvorson et al. | 167—18 |
| 2,282,732 | 5/1942 | Lean et al. | 167—22 |
| 2,369,097 | 2/1945 | Wilkins | 167—18 X |
| 2,377,446 | 6/1945 | Payne | 167—39 X |
| 2,419,073 | 4/1947 | Hammer | 167—39 X |
| 2,503,073 | 4/1950 | Pierce | 260—124 |
| 2,551,446 | 5/1951 | Marks | 167—16 |
| 2,742,736 | 4/1956 | MacKay | 167—39 X |
| 2,799,612 | 6/1957 | Santmeyer | 167—24 |
| 2,850,492 | 9/1958 | Erskine et al. | 260—124 |
| 2,858,250 | 10/1958 | Geary | 167—18 |
| 2,929,700 | 3/1960 | Bennett | 71—1 |

OTHER REFERENCES

Chem. Abstracts 54: 805G; 16676C (1960).

Parnell et al.: "Some Observations on the Lethal Effects of Various Chemicals Against the Free-Living Stages of Schlerostomes (Nematoda), British J. Pharmacol. 7: 509–33 (1952) (167, Nematode).

Spector: Handbook of Biological Data, pages 66–67, 88, 196, 206, 221–225, 241, 255, 337, 410–416, 440, 455, 488–492, 498–509, 524, published 1956, W. B. Saunders Co., Philadelphia, Pa.

LEWIS GOTTS, *Primary Examiner.*

SHEP K. ROSE, *Assistant Examiner.*